(12) United States Patent
Du et al.

(10) Patent No.: US 11,132,760 B2
(45) Date of Patent: Sep. 28, 2021

(54) GRAPHICS INSTRUCTION OPERANDS ALIAS

(71) Applicant: QUALCOMM Incorporated, San Diego, CA (US)

(72) Inventors: Yun Du, San Diego, CA (US); Andrew Evan Gruber, Arlington, MA (US); Chihong Zhang, San Diego, CA (US); Gang Zhong, San Diego, CA (US); Jian Jiang, San Diego, CA (US); Fei Wei, San Diego, CA (US); Minjie Huang, San Diego, CA (US); Zilin Ying, San Diego, CA (US); Yang Xia, San Diego, CA (US); Jing Han, San Jose, CA (US); Chun Yu, Rancho Santa Fe, CA (US); Eric Demers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 16/714,052

(22) Filed: Dec. 13, 2019

(65) Prior Publication Data
US 2021/0183005 A1    Jun. 17, 2021

(51) Int. Cl.
| | |
|---|---|
| *G06T 1/20* | (2006.01) |
| *G06F 9/30* | (2018.01) |
| *G06F 9/50* | (2006.01) |
| *G06F 9/38* | (2018.01) |
| *G06F 1/03* | (2006.01) |

(52) U.S. Cl.
CPC .................. *G06T 1/20* (2013.01); *G06F 1/03* (2013.01); *G06F 9/30032* (2013.01); *G06F 9/30043* (2013.01); *G06F 9/3824* (2013.01); *G06F 9/5061* (2013.01)

(58) Field of Classification Search
None
See application file for complete search history.

(56) References Cited

U.S. PATENT DOCUMENTS

| | | | | |
|---|---|---|---|---|
| 2002/0145611 | A1* | 10/2002 | Dye ......................... | G09G 5/14 345/543 |
| 2004/0128573 | A1* | 7/2004 | Sperber ................... | G06F 9/384 713/320 |
| 2014/0096115 | A1* | 4/2014 | Guan ........................ | G06F 8/41 717/140 |
| 2015/0379680 | A1* | 12/2015 | Du .......................... | G09G 5/363 345/426 |
| 2016/0092234 | A1* | 3/2016 | Vasudevan .......... | G06F 9/30174 712/7 |
| 2018/0095765 | A1* | 4/2018 | Mekkat ................... | G06F 8/445 |

* cited by examiner

*Primary Examiner* — Michael J Cobb
(74) *Attorney, Agent, or Firm* — Holland & Hart LLP (57) ABSTRACT

Methods, systems, and devices for graphic processing are described. The methods, systems, and devices may include or be associated with identifying a graphics instruction, determining that the graphics instruction is alias enabled for the device, partitioning an alias lookup table into one or more slots, allocating a slot of the alias lookup table based on the partitioning and determining that the graphics instruction is alias enabled, generating an alias instruction based on allocating the slot of the alias lookup table and determining that the graphics instruction is alias enabled, and processing the alias instruction.

20 Claims, 8 Drawing Sheets

GRAPHICS INSTRUCTION OPERANDS ALIAS

BACKGROUND

Graphics devices are widely used to render 2-dimensional (2-D) and 3-dimensional (3-D) images for various applications, such as video games, graphics programs, computer-aided design (CAD) applications, 3-D printing, simulation and visualization tools, imaging, and the like. A graphics device may perform various graphics operations to render an image. The graphics operations may include rasterization, stencil and depth tests, texture mapping, shading, and the like. A 3-D image may be modeled with surfaces, and each surface may be approximated with polygons, such as triangles. The number of triangles used to represent a 3-D image for rendering purposes is dependent on the complexity of the surfaces as well as the desired resolution of the image.

Each triangle may be defined by three vertices, and each vertex is associated with various attributes such as space coordinates, color values, and texture coordinates. When a graphics device uses a vertex processor during the rendering process, the vertex processor may process vertices of the various triangles. Each triangle is also composed of picture elements (pixels). When the graphics device also, or separately, uses a pixel processor during the rendering process, the pixel processor renders each triangle by determining the values of the components of each pixel within the triangle.

In many examples, a graphics device may utilize a graphics processor to perform certain graphics operations such as shading. In some examples, shading may be a relatively complex graphics operation involving lighting and shadowing. In some examples, a graphics processor may execute a variety of instructions when performing rendering, and may use one or more execution units to aid in the execution of the instructions. However, in some examples, processing graphics instructions may result in redundant operations. In some examples, redundant operations may result in relatively poor power usage and a poor user experience.

SUMMARY

The described techniques relate to improved methods, systems, devices, and apparatuses that support graphics instruction operands alias. Generally, the described techniques provide for generating alias instructions in conjunction with processing graphics instructions. In some examples, generating alias instructions and related operations may result in eliminating redundant operations when processing graphics instructions. In some examples, eliminating redundant operations may result in improving power usage and user experience associated with graphics applications.

A method of graphic processing is described. The method may include identifying a graphics instruction, determining that the graphics instruction is alias enabled for the device, partitioning an alias lookup table into one or more slots, allocating a slot of the alias lookup table based on the partitioning and determining that the graphics instruction is alias enabled, generating an alias instruction based on allocating the slot of the alias lookup table and determining that the graphics instruction is alias enabled, and processing the alias instruction.

An apparatus for graphic processing is described. The apparatus may include a processor, memory coupled with the processor, and instructions stored in the memory. The instructions may be executable by the processor to cause the apparatus to identify a graphics instruction, determine that the graphics instruction is alias enabled for the device, partition an alias lookup table into one or more slots, allocate a slot of the alias lookup table based on the partitioning and determining that the graphics instruction is alias enabled, generate an alias instruction based on allocating the slot of the alias lookup table and determining that the graphics instruction is alias enabled, and process the alias instruction.

Another apparatus for graphic processing is described. The apparatus may include means for identifying a graphics instruction, determining that the graphics instruction is alias enabled for the device, partitioning an alias lookup table into one or more slots, allocating a slot of the alias lookup table based on the partitioning and determining that the graphics instruction is alias enabled, generating an alias instruction based on allocating the slot of the alias lookup table and determining that the graphics instruction is alias enabled, and processing the alias instruction.

A non-transitory computer-readable medium storing code for graphic processing is described. The code may include instructions executable by a processor to identify a graphics instruction, determine that the graphics instruction is alias enabled for the device, partition an alias lookup table into one or more slots, allocate a slot of the alias lookup table based on the partitioning and determining that the graphics instruction is alias enabled, generate an alias instruction based on allocating the slot of the alias lookup table and determining that the graphics instruction is alias enabled, and process the alias instruction.

Some examples of the method, apparatuses, and non-transitory computer-readable medium described herein may further include operations, features, means, or instructions for identifying an operand type associated with the graphics instruction, where the partitioning of the alias lookup table may be based on the operand type.

Some examples of the method, apparatuses, and non-transitory computer-readable medium described herein may further include operations, features, means, or instructions for determining that the operand type may be a first type, fetching an operand of the graphics instruction from a local buffer of the device, storing the operand in a source data field associated with the allocated slot, and setting a value in a source data type field associated with the allocated slot based on the first type.

In some examples of the method, apparatuses, and non-transitory computer-readable medium described herein, processing the alias instruction may include operations, features, means, or instructions for processing the operand stored in the source data field based on the operand type being the first type.

Some examples of the method, apparatuses, and non-transitory computer-readable medium described herein may further include operations, features, means, or instructions for determining that the operand type may be a second type different than the first type, and setting the source data type as the second type based on determining that the operand type may be the second type.

In some examples of the method, apparatuses, and non-transitory computer-readable medium described herein, processing the alias instruction may include operations, features, means, or instructions for processing the operand stored in the local buffer based on the operand type being the second type.

In some examples of the method, apparatuses, and non-transitory computer-readable medium described herein, an entry of the slot includes a valid bit, or a destination data field, or the source data type, or the source data field, or any combination thereof.

Some examples of the method, apparatuses, and non-transitory computer-readable medium described herein may further include operations, features, means, or instructions for configuring a number of slots or a number of entries per slot in the alias lookup table based on a predetermined value, where the predetermined value may be based on an average data size associated with the graphics instruction.

Some examples of the method, apparatuses, and non-transitory computer-readable medium described herein may further include operations, features, means, or instructions for determining that the operand of the graphics instruction does not fit within the allocated slot or the configured number of entries of the allocated slot, and using a move instruction with the processing of the alias instruction based on determining that the operand of the graphics instruction does not fit within the allocated slot or the configured number of entries of the allocated slot.

Some examples of the method, apparatuses, and non-transitory computer-readable medium described herein may further include operations, features, means, or instructions for configuring a number of entries per slot in the alias lookup table based on a size of the graphics instruction or a maximum possible size of the graphics instruction, where a number of slots in the alias lookup table may be based on the configured number of entries per slot in the alias lookup table.

Some examples of the method, apparatuses, and non-transitory computer-readable medium described herein may further include operations, features, means, or instructions for releasing the slot of the alias lookup table after completing the processing of the graphics instruction.

In some examples of the method, apparatuses, and non-transitory computer-readable medium described herein, the graphics instruction includes a texture instruction or a load store instruction.

DETAILED DESCRIPTION

In some examples, streaming processors may be key units in graphical processor units (GPUs). In some examples, a streaming processor may perform parallel computing operations of a GPU. In some systems, different types of instructions within a streaming processor may be defined in fixed bits (e.g., 64 bits for a 64-bit system, 32 bits for a 32-bit system, etc.) because it may be more efficient to process bits of a fixed size versus bits of a variable size. However, there are some exceptions such as a texture (TEX) instruction or load/store (LDST) instruction. In one example, a TEX instruction may include up to 16 operands and an LDST instruction may include up to 8 operands. In some examples, the operands of the TEX and LDST instructions may include integer values and/or floating point values associated with register values or variables, constant values, memory addresses, label names, identifiers, etc. In some examples, the operands of the TEX and LDST instructions may include a general purpose register identifier (GPR ID, normally 8 bits), constant ID (e.g., 12 bits), immediate operand (e.g., up to 32 bits), or uniform GPR ID (uGPR ID, e.g., 8 bits), etc. However, in some examples it may not be practical or efficient to embed multiple different operands in a single field, such as a single instruction field. Accordingly, in some examples, operand vectorization may be used to embed more data into a single instruction field. However, when coordinates (e.g., u, v) are generated individually and stored in non-consecutive registers, then a move instruction may be performed to make a coordinate (u, v) and operand (e.g., GPR ID) consecutive in order to process the coordinate (u, v) and the operand. In some examples, a (u, v) coordinate may refer to a texture coordinate, which may be associated with a 2D image (x, y) coordinate. In some examples, a (u, v) coordinate may be a texture instruction operand that is stored in a GPR that is indexed with a GPR ID.

The described techniques may include operations to eliminate the move instruction to make a coordinate (u, v) and operand (e.g., GPR ID) consecutive when coordinates (e.g., u, v) are generated individually and stored in non-consecutive registers. Eliminating the move instruction may, in some examples, include (1) adding a new alias instruction with a fixed size; and (2) adding an alias instruction decoder and an alias lookup table to the streaming processor. In some examples, the new alias instruction may be coupled to exception instructions such as TEX instructions and/or LDST instructions. In some examples, the alias instruction may be used to rename an operand (e.g., GPR ID, uGPR ID, constant ID, immediate, etc.) to a new alias GPR ID. In some examples, the alias lookup table may have, for each entry, a destination ID (e.g., new alias GPR ID), a source data type, and an original ID (e.g., original GPR ID, uGPR ID, constant ID, immediate, etc.).

Aspects of the disclosure are initially described in the context of graphics processing systems. Aspects of the disclosure are further illustrated by and described with reference to apparatus diagrams, system diagrams, and flowcharts that relate to graphics instruction operands alias.

Figure 1:
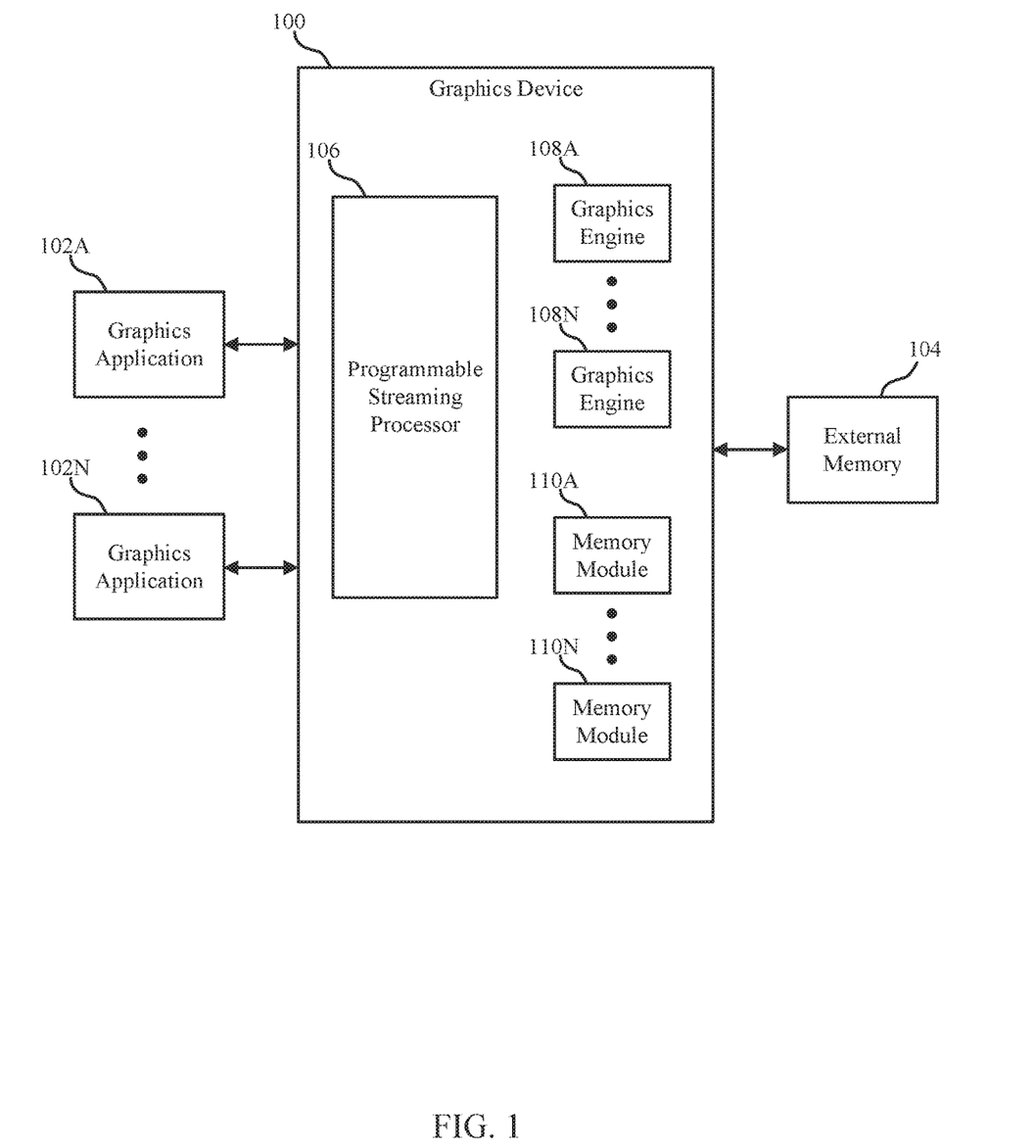
FIG. 1 illustrates an example of a system for graphic processing that supports graphics instruction operands alias in accordance with aspects of the present disclosure.

FIG. 1 illustrates a block diagram illustrating various components that may be included within a graphics processing system, according to one aspect of the techniques described herein. The graphics processing system of FIG. 1 may be a stand-alone system or may be part of a larger system, such as a computing system, a wireless communication device (such as a wireless communication device handset), or part of a digital camera, or video device, or other such devices. The exemplary system shown in FIG. 1 may include one or more graphics applications 102A-102N, a graphics device 100, and external memory 104. Graphics device 100 may be communicatively coupled to external memory 104 and each of graphics applications 102A-102N. In one aspect, graphics device 100 may be included on one or more integrated circuits, or chips.

The graphics applications 102A-102N may include various different applications, such as video game, video, camera, or other graphics or streaming applications. These graphics applications 102A-102N may run concurrently and are each able to generate threads of execution to achieve desired results. A thread may indicate a specific task that may be performed with a sequence of one or more graphics instructions. Threads may allow graphics applications 102A-102N to have multiple tasks performed simultaneously and to share resources.

Graphics device 100 may receive the threads from graphics applications 102A-102N and may perform the tasks indicated by these threads. In the aspect shown in FIG. 1, graphics device 100 may include a programmable streaming processor 106, one or more graphics engines 108A-108N, and one or more memory modules 110A-110N. Processor 106 may perform various graphics operations, such as shading, and may compute transcendental elementary functions for certain applications. In one aspect, processor 106 may comprise an instruction-based, adaptive streaming processor for mobile graphics applications. Graphics engines 108A-108N may perform other graphics operations, such as texture mapping. Memory modules 110A-110N may include one or more caches to store data and graphics instructions for processor 106 and graphics engines 108A-108N.

Graphics engines 108A-108N may include one or more engines that perform various graphics operations, such as shading, triangle setup, rasterization, stencil and depth tests, attribute setup, pixel interpolation, etc. External memory 104 may be a large, slower memory with respect to memory modules 110A-110N. In one aspect, external memory 104 is located further away (e.g., off-chip) from graphics device 100. External memory 104 stores data and graphics instructions that may be loaded into one or more of the memory modules 110A-110N.

In some examples, a compiler (e.g., a compiler of the graphics processing system or a compiler of a computing device that includes the graphics processing system) may generate alias instructions in conjunction with one or more processors of the computing device such as a central processor of the computing device and/or processor 106 configured for processing graphics instructions. In some examples, the compiler generating alias instructions may enable processor 106 to improve the efficiency of processing graphics instructions. In some examples, the compiler generating alias instructions may enable some operations to be eliminated when processing graphics instructions. In some examples, the compiler generating alias instructions may enable some buffer reads to be eliminated when processing graphics instructions. In some examples, the compiler generating alias instructions may enable different decoders of processor 106 to operate in parallel when processing graphics instructions.

In some examples, processor 106 may store a coordinate (u, v) and operand (e.g., general purpose register (GPR) ID) in consecutive registers when the coordinate and operand are generated individually and first stored in non-consecutive registers. In some examples, processor 106 storing the coordinate and operand consecutively may result in some instructions (e.g., move instructions) being eliminated when processing a graphics instruction.

In some examples, a compiler may generate an alias instruction in conjunction with processor 106 processing a graphics instruction. In some examples, a compiler may generate an alias instruction in conjunction with processor 106 processing a texture (TEX) instruction or a load store (LDST) instruction. In some examples, processor 106 may use an alias instruction to rename an operand (e.g., GPR ID, uniform GPR (uGPR) ID, constant ID, immediate, etc.) to an alias GPR ID. In some examples, processor 106 may process a graphics instruction and a generated alias instruction in parallel to enable processor 106 to improve the efficiency of processing graphics instructions, resulting in power savings and improved user experience based on the reduced processing latency.

Figure 2:
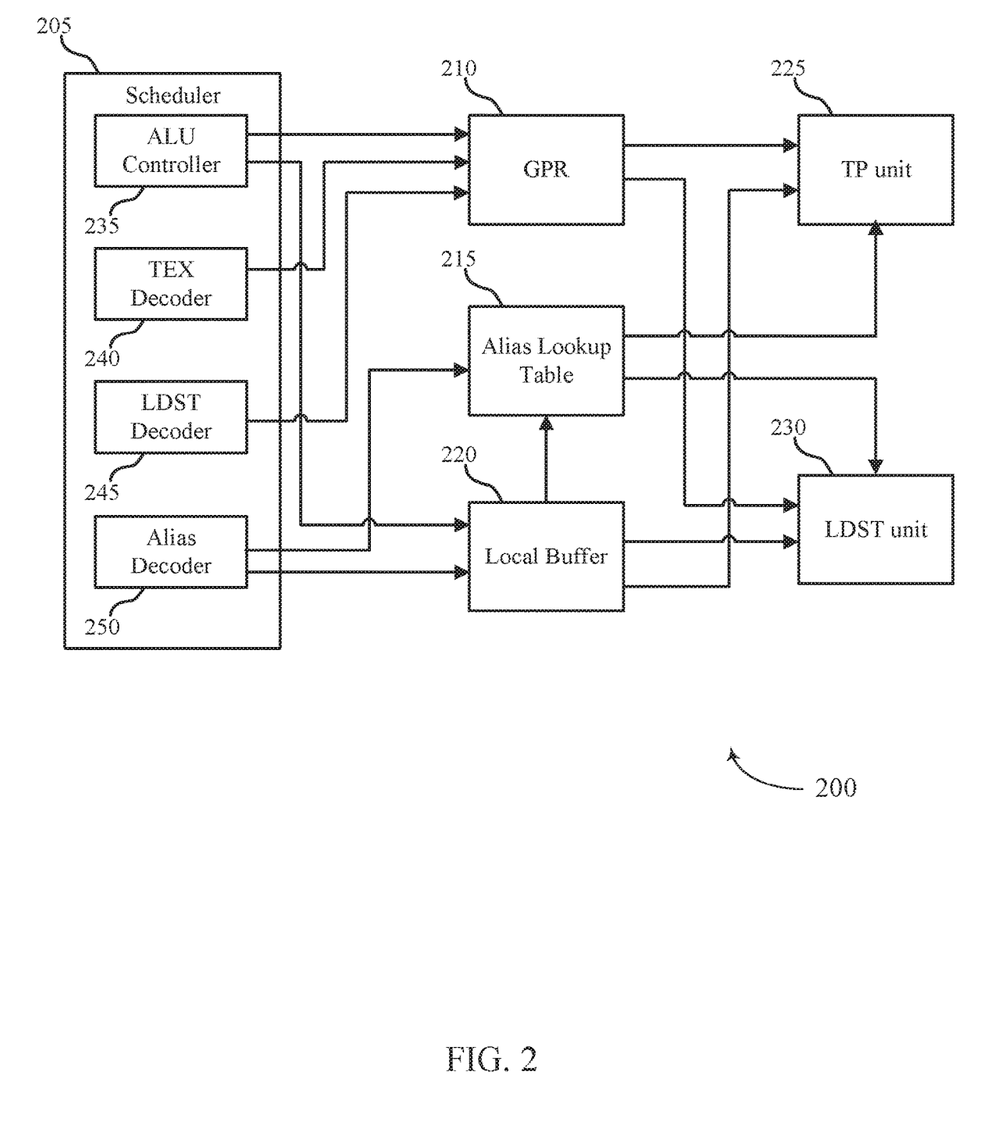
FIG. 2 illustrates an example of a system that supports graphics instruction operands alias in accordance with aspects of the present disclosure.

FIG. 2 illustrates an example of a graphics system 200 may include scheduler 205, general purpose register (GPR) 210, alias lookup table (ATB) 215, local buffer 220, texture processing unit (TP) unit 225, and load store (LDST) unit 230. As shown, the scheduler 205 may include arithmetic logic unit (ALU) controller 235, texture (TEX) decoder 240, load store (LDST) decoder 245, and alias decoder 250.

In the illustrated example, the ALU controller 235 may communicate with the GPR 210 or the local buffer 220. For example, ALU controller 235 may read data from GPR 210, or read data from local buffer 220, or read data from both. In some examples, ALU controller 235 may write data to GPR 210, or write data to local buffer 220, or write data to both. As shown, the TEX decoder 240 may communicate with the GPR 210. For example, TEX decoder 240 may read data from GPR 210. In some examples, TEX decoder 240 may write data to GPR 210. As shown, the LDST decoder 245 may communicate with the GPR 210. For example, LDST decoder 245 may read data from GPR 210. In some examples, LDST decoder 245 may write data to GPR 210.

In the illustrated example, the alias decoder 250 may communicate with the alias lookup table 215 or the local buffer 220. For example, alias decoder 250 may read data from alias lookup table 215, or read data from local buffer 220, or read data from both. In some examples, alias decoder 250 may write data to alias lookup table 215. In some examples, alias decoder 250 may send a command to alias lookup table 215. For example, alias decoder 250 may instruct alias lookup table 215 associate the command with alias data stored in the alias lookup table 215 and to store the command with the alias data in the alias lookup table 215. In some examples, the command and alias data may be processed by TP unit 225 or LDST unit 230.

In some examples, the scheduler 205 may be configured to read data, or write data, or process data, or analyze data, or decode data, or encode data, or any combination thereof. In some examples, scheduler 205 may be configured to manages execution of threads. In some examples, a graphics application may un concurrently with scheduler 205. In some examples, a graphics application may generate one or more threads of execution to achieve desired results. A thread may indicate one or more tasks that may be performed with a sequence of one or more graphics instructions. Threads allow a graphics application to have multiple tasks performed simultaneously and to share resources.

In some examples, a thread may be a sequence (e.g., a smallest sequence) of programmed instructions that may be managed independently by scheduler 205. In some examples, a thread may be a component of a process. Multiple threads may exist within one process, executing concurrently and sharing resources such as memory, while different processes may or may not share these resources. In some examples, threads of a process may share executable code and the values of one or more dynamically allocated variables and non-thread-local global variables at any given time. In some examples, a fiber may be a lightweight thread of execution. Like threads, fibers may share address space. However, fibers may use cooperative multitasking while threads may use preemptive multitasking. While threads may depend on the kernel's thread scheduler to preempt a busy thread and resume another thread, fibers may yield themselves to run another fiber while executing. In some examples, a fiber may be associated with coroutines. While coroutines may be a language-level construct, a form of control flow, fibers may be a systems-level construct, viewed as threads that do not run in parallel. In some examples, fibers may be viewed as an implementation of coroutines, or as a substrate on which to implement coroutines.

In some examples, a wave (e.g., wavefront, warp, etc.) may be a basic unit of scheduling of a graphical processor unit (GPU). In some examples, a wave may be the smallest executable unit of code or the minimum size of the data processed in single instruction multiple data (SIMD) processing. In some examples, a wave may be a set of threads that all share the same code, follow the same execution path with minimal divergences (e.g., expected to stall at the same places). In some examples, a wave processes a single instruction over all of the threads in it at the same time. When a GPU launches a grid of threads for a kernel, that grid may be divided into waves of thread blocks. The size of a wave may depend on the number of streaming processors on the GPU and the theoretical occupancy of the kernel.

Scheduler 205 may fetch instructions for each thread from an instruction cache, decode each instruction as needed (e.g., via TEX decoder 240, LDST decoder 245, alias decoder 250, etc.), and perform flow control for each thread scheduler 205 processes. In some examples, TEX decoder 240 may be configured to process texture instructions (e.g., decode texture instructions); LDST decoder 245 may be configured to process load store instructions (e.g., decode load store instructions); and alias decoder 250 may be configured to process alias instructions (e.g., decode alias instructions). For LDST decoder 245, each fiber memory address base may be uniform and scheduler 205 may fetch from LDST data from GPR 210. In some examples, load store data may be offset (e.g., an offset unique to the load store data).

Scheduler 205 may select active threads for execution, check for read/write port conflicts among selected threads and, if there is no conflict, send instructions for a thread to processing units or execution units (e.g., ALU controller 235, TP unit 225, LDST unit 230, etc.). In some examples, graphics system 200 may include one or more processors, where at least one of the one or more processors includes one or more execution units.

In some examples, the ALU controller 235 may be configured to perform arithmetic and bitwise operations on data (e.g., integer binary numbers). In some examples, inputs to ALU controller 235 may include data to be operated on (e.g., one or more operands), and a code indicating the operation to be performed, where an output of the ALU controller 235 may be a result of performing the indicating operation on the operand.

In some examples, TP unit 225 may be configured to process texture data or texture element (texel) data from GPR 210, or alias lookup table 215, or local buffer 220, or any combination thereof. Similarly, LDST unit 230 may be configured to process load store data from GPR 210, or alias lookup table 215, or local buffer 220, or any combination thereof. In some examples, an attribute such as a space coordinates, a color value, or a texture coordinate may be an immediate value or a constant from local buffer 220.

In some examples, graphics system 200 may be incorporated in a streaming processor. In some examples, graphics system 200 may include one or more compilers. In some examples, at least one of the one or more compilers may be configured to receive one or more application instructions and compile the one or more application instructions into one or more binary instructions that are then processed by one or more processors associated with graphics system 200 (e.g., ALU controller 235, TP unit 225, LDST unit 230, etc.). In some examples, TEX decoder 240 may include one or more processors, LDST decoder 245 may include one or more processors, or alias decoder 250 may include one or more processors.

In some examples, graphics system 200 may be configured to process graphics workloads such as vertex shading and fragment shading, and may also use its processing units (e.g., ALU controller 235, TP unit 225, LDST unit 230) and storage (GPR 210, alias lookup table 215, local buffer 220) to process graphics computations. In some examples, ALU controller 235 may be configured to process parallel instructions. In some examples, graphics system 200 may include on-chip storage such as GPR 210, local buffer 220, memory for texture sample storage, load store memory for general read and write data, etc. In some examples, GPR 210 may be configured to store per fiber private data. In some examples, local buffer 220 may be configured to store per shader constants, or per kernel constants, or per wave uniform GPR data (e.g., uGPR), or per compute work group data, or local memory data, or any combination thereof.

In some examples, compiled instructions may be associated with operands in GPR 210 or local buffer 220, or both. Thus, when graphics system 200 processes a compiled instruction one or more operands may be fetched from GPR 210 or from local buffer 220, or from both. In one example, TEX decoder 240 may be configured to fetch UV texture a coordinate and/or other attributes such as level of detail (LOD), bias, LOD bias, etc., from GPR 210.

In some examples, graphics system 200 may be configured for SIMD processing. In some examples, at least a portion of graphics system 200 may be based on an instruction set architecture (ISA). In some examples, at least some different types of instructions associated with graphics system 200 may be defined in fixed bits (e.g., 16 bits, 32 bits, 64 bits), where a size of at least some instructions are configured to one of the fixed bit values. In some examples, the size of TEX instructions or LDST instructions may vary from the fixed bit sizes. For example, the graphics system 200 may be configured with a 64-bit fixed bit size for instructions, while the size of TEX instructions or LDST instructions may be based on a size of operands associated with the TEX instructions or LDST instructions. In some examples, TEX instruction may include up to 16 operands, and LDST instructions may include up to 8 operands. Examples of these operands may include an 8-bit GPR ID operand, a 12-bit constant ID operand, a 32-bit immediate operand, or an 8-bit uGPR ID operand.

In some examples, it may be impractical or inefficient to embed multiple different operands in a single instruction field. In some examples, operand vectorization may be used to embed more data into a single field. For example, texture sample UV texture coordinate may be interpolated as a vector, and so operand vectorization may be used with the UV texture coordinate. However, when UV texture coordinates are generated individually and stored non-consecutively in GPR 210, then a move instruction may be used to make the UV texture coordinate and GPR ID consecutive. Table 1 is an example of a shader code sequence that uses redundant move commands (e.g., mov.s32s32, mov.f32f32) to accommodate operands vectorization.

TABLE 1

| | |
|---|---|
| 0336 mov.s32s32 | : RF2.0, I0x00000000 |
| 0337 mov.f32f32 | : (ss)RF1.3,RF4.1 |
| 0338 nop | : (rpt5) |
| 0339 isam | : (X)RF0.2, RF1.3, s0, t11 |
| 0340 mov.s32s32 | : (ss)RF2.0, I0-x00000001 |
| 0341 mov.f32f32 | : RF1.3,RF4.1 |
| 0342 nop | : (rpt5) |
| 0343 isam | : (X)RF1.1, RF1.3, s0, t11 |

In the example shader code sequence, move instruction #0336 moves immediate value 0 to register file 2.0 (RF2.0) and move instruction #0337 moves RF4.1 to RF1.3, enabling sample instruction #0339 UV texture coordinate to be stored and later fetched from consecutive GPR (RF1.3 and RF2.0). Similar operations are shown for instruction sequence #0340, #0341 and #0343. For a mobile GPU, such redundant ALU move instructions are significant because a mobile device is battery and thermal limited. Thus, eliminating wasteful operations helps extend battery life and improves user experience. Additionally, operands vectorization adds complexity for the compiler to utilize GPR space due to continuous GPR allocation constraints and introduces extra synchronization at GPR recycle between different execution units. For example, in the exemplary shader code sequence shown above, RF2.0 of instruction #0339 operand may be recycled to assign immediate value 1, but instruction #0340 may have to wait (where ss represents short sync) for instruction #0339 operands fetch to complete because TEX and ALU may have different throughput (e.g., TEX may process 8 fibers per cycles, where ALU may process 64 fibers per cycles).

As shown, graphics system 200 adds ISA instruction "alias" or "ALIAS." In some examples, the size of an alias instruction may be configured to have the same fixed bit size of graphics system 200. In some examples, an alias instruction may be coupled with a TEX instruction or LDST instruction. In some examples, an alias instruction may be coupled singly with a TEX instruction or LDST instruction. In some examples, the alias instruction may rename a GPR operand, constant operand, uGPR operand, or immediate operand to a new GPR ID. In some examples, this new GPR ID may be meaningful or relevant to subsequent TEX or LDST instructions.

As shown, graphics system 200 adds alias decoder 250 for alias instructions and alias lookup table (ATB) 215. In some examples, alias lookup table 215 may be configured to have a minimum number of entries. In some examples, the minimum number of entries may be a factor of two (e.g., 8 entries, 16 entries, 32 entries, 64 entries, 128 entries, 256 entries, etc.). In some examples, the alias lookup table 215 may be configured to support a maximum size of operands associated with an alias instruction associated with a single TEX instruction or a single LDST instruction. For example, if a maximum size of an operand is 64 bits, then each entry of alias lookup table 215 may be configured to hold at least 64 bits. Thus, if the alias lookup table 215 holds 1 kilobyte of memory (e.g., 8,192 bits) and each entry holds 64 bits, then alias lookup table 215 may be configured with 128 entries.

In some examples, an entry of alias lookup table 215 may include one valid bit field, a destination GPR ID (new GPR ID) field, a source data type field (i.e. 0 for GPR ID; 1 for immediate value), and a data field to store the original GPR ID or original immediate data. In some examples, alias lookup table 215 may be configured to have multiple slots (e.g., alias slots). In some examples, alias decoder 250 may store immediate data (e.g., from an alias instruction), fetch a constant (e.g., uGPR) from local buffer 220 as an input to alias lookup table 215 as an immediate value, enabling TEX decoder 240 or LDST decoder 245 to skip a local buffer fetch.

In some examples, a number of slots may be configured by compiler statistics (e.g., based on biggest or maximum number of alias instructions per sample or LDST). In some examples, the number of entries per alias slot may be fixed to a certain number (e.g., 1 entry per alias slot, 2 entries per alias slot, 4 entries per alias slot, 8 entries per alias slot, 16 entries per alias slot, etc.). Using alias instructions may avoid using the redundant move instructions (e.g., mov.s32s32, mov.f32f32) when processing a TEX instruction or LDST instruction. However, in some examples when the number of alias instructions exceeds the number of entries for a given alias slot, then the redundant move instructions (e.g., mov.s32s32, mov.f32f32) may be used to process a TEX instruction or LDST instruction.

In some examples, a graphics application may generate one or more application instructions and a compiler of graphics system 200 may compile the one or more application instructions into one or more binary instructions that are then processed by one or more processors associated with graphics system 200. In some examples, a compiler, in conjunction with scheduler 205, may identify the one or more binary instructions and generate at least one alias instruction for at least one of the one or more binary instructions.

In some examples, one or more of the binary instructions may be marked as alias enabled instructions. For example, TEX instructions and LDST instructions may be marked as alias enabled instructions. In some examples, a compiler, in conjunction with scheduler 205, may generate at least one alias instruction for each alias enabled instruction. In some examples, before issuing an alias instruction to alias decoder 250, scheduler 205 may acquire at least one alias slot of alias lookup table 215.

In some examples, scheduler 205 may identify one or more operands associated with a binary instruction or an alias instruction. In some examples, scheduler 205 may determine an operand type associated with an identified operand. In some examples, scheduler 205 may set a source data type field of an entry in the acquired alias slot of alias lookup table 215. When scheduler 205 determines an operand type of an identified operand is uGPR or constant, scheduler 205 may alias decoder 250 may be configured to fetch the operand from local buffer 220, store the uGPR ID (e.g., the value of the uGPR ID) in the acquired alias slot of the alias lookup table 215, and set the source data type to 1 for the associated entry.

When scheduler 205 determines an operand type of an identified operand is immediate, scheduler 205 may store the value of the immediate in the acquired alias slot of the alias lookup table 215 and set the source data type to 1. When scheduler 205 determines an operand type of an identified operand is GPR ID, scheduler 205 may store the value of the GPR 1D in the acquired alias slot of the alias lookup table 215 and set the source data type to 0. In some examples, for at least one operation (e.g., at least one operation of the exemplary shader code sequence) scheduler 205 may execute the alias instruction using the operand stored in the acquired alias slot of the alias lookup table 215 in place of the original operand. In some examples, TEX decoder 240 or LDST decoder 245 may use an operand stored in the acquired alias slot. In some examples, TEX decoder 240 or LDST decoder 245 may use the acquired slot to replace an aliased GPR ID when the data type is 0 and then fetch the operand from the original GPR ID location. Otherwise, when the data type is 1. TEX decoder 240 or LDST decoder 245 may skip or bypass GPR fetch and use the value stored in the acquired alias slot directly.

In some examples, after scheduler 205 completes processing a TEX instruction or LDST instruction (e.g., operand processing, etc.), scheduler 205 may release the acquired alias slot of alias lookup table 215. In some examples, after scheduler 205 completes execution of an alias instruction, scheduler 205 may issue a subsequent TEX instruction to TEX decoder 240 or a subsequent LDST instruction to LDST decoder 245. In some examples, scheduler 205 may mark the subsequent TEX instruction or the subsequent LDST instruction as an alias enabled instruction. In some examples, scheduler 205 may acquire another slot of the alias lookup table 215 for the subsequent TEX instruction or subsequent LDST instruction.

The techniques described herein enable several improvements. For example, the techniques described herein eliminate the redundant mov command from the shader code sequence provided above, reduces additional synchronization, and reduces the GPR footprint. Additionally, the techniques described herein simplify TEX and LDST processing because local buffer fetch is performed by alias decoder 250, eliminating LDST and TEX local buffer reads and leaving just GPR fetches to be performed by TEX decoder 240 for TEX instructions or LDST decoder 245 for LDST instructions. Eliminating LDST and TEX local buffer reads improves access localization of local buffer 220 and improves processing time of TEX and LDST instructions. Additionally, the techniques described herein enable TEX decoder 240 or LDST decoder 245 to execute in parallel with alias decoder 250, reducing TEX and LDST processing cycles (e.g., when local buffer and GPR operands are mixed).

Based on the techniques described herein, the original shader code sequence of Table 1 may be optimized as follows in Table 2:

TABLE 2

| | |
|---|---|
| 0336 alias | : RF1.3, RF4.1 |
| 0337 alias | : RF2.0, I0x000000000 |
| 0338 isam | : (X)RF0.2, RF1.3, s0, t11 |
| 0339 alias | : RF2.0, I0x000000001 |
| 0340 isam | : (X)RF1.1, RF1.3, s0, t11 |

In comparison to the original shader code sequence, the improved shader code sequence of Table 2 eliminates three ALU instructions from the original shader code sequence of Table 1, eliminates 12 NOP cycles from the original shader code sequence, reduces shader code size by a factor of 3, and eliminates several data synchronization steps. Thus, the techniques described herein provide improved performance, improved power efficiency, and improved user experience by eliminating TEX, LDST operand vectorization overhead.

Figure 3:
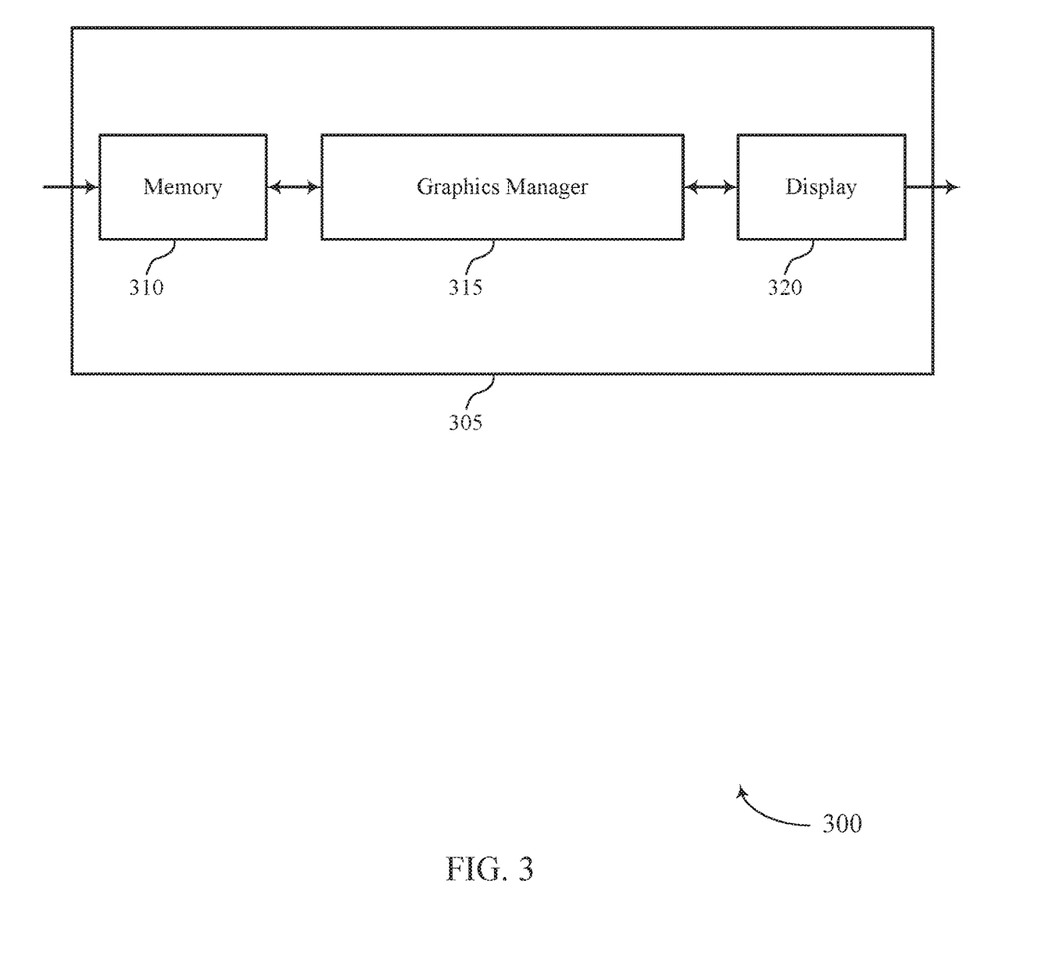
FIGS. 3 and 4 show block diagrams of devices that support graphics instruction operands alias in accordance with aspects of the present disclosure.

FIG. 3 shows a block diagram 300 of a device 305 that supports graphics instruction operands alias in accordance with aspects of the present disclosure. The device 305 may be an example of aspects of a device as described herein. The device 305 may include a memory 310, a graphics manager 315, and a display 320. The device 305 may also include a processor. Each of these components may be in communication with one another (e.g., via one or more buses).

The memory 310 may store information (e.g., monitoring data, change detection data, analysis data, image metadata) generated by other components of device 305 such as graphics manager 315. For example, memory 310 may store one or more images samples that graphics manager 315 compares with an output of graphics manager 315. In some examples, the memory 310 may be collocated with one or more graphics processors in a graphics display device (e.g., device 305). For example, the memory 310 may be an example of aspects of the memory 630 described with reference to FIG. 6. Memory 310 may comprise one or more computer-readable storage media. Examples of memory 310 include, but are not limited to, random access memory (RAM), static RAM (SRAM), dynamic RAM (DRAM), read-only memory (ROM), electrically erasable programmable read-only memory (EEPROM), compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor (e.g., graphics manager 315).

The graphics manager 315 may identify a graphics instruction, determine that the graphics instruction is alias enabled for the device, process the alias instruction, partition an alias lookup table into one or more slots, allocate a slot of the alias lookup table based on the partitioning and determining that the graphics instruction is alias enabled, and in conjunction with a compiler generate an alias instruction based on allocating the slot of the alias lookup table and determining that the graphics instruction is alias enabled. The graphics manager 315 may be an example of aspects of the graphics manager 610 described herein.

The graphics manager 315, or its sub-components, may be implemented in hardware, code (e.g., software or firmware) executed by one or more processors, or any combination thereof. When implemented in code executed by a processor, the functions of the graphics manager 315, or its sub-components may include or be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The graphics manager 315, or its sub-components, may be physically located at various positions, including being distributed such that portions of functions are implemented at different physical locations by one or more physical components. In some examples, the graphics manager 315, or its sub-components, may be a separate and distinct component in accordance with various aspects of the present disclosure. In some examples, the graphics manager 315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, display 320 may display graphics based on processing performed by graphics manager 315 (e.g., processing of alias instructions by graphics manager 315). In some examples, display 320 may or at least some of its sub-components may be implemented in hardware, software executed by a processor, firmware, or any combination thereof. When implemented in software executed by a processor, the functions of the display 320 and/or at least some of its various sub-components may be executed by graphics manager 315, which may include at least one of a general-purpose processor, a DSP, an ASIC, an FPGA or other programmable logic device, discrete gate or transistor logic, discrete hardware components, or any combination thereof designed to perform the functions described in the present disclosure.

Figure 4:
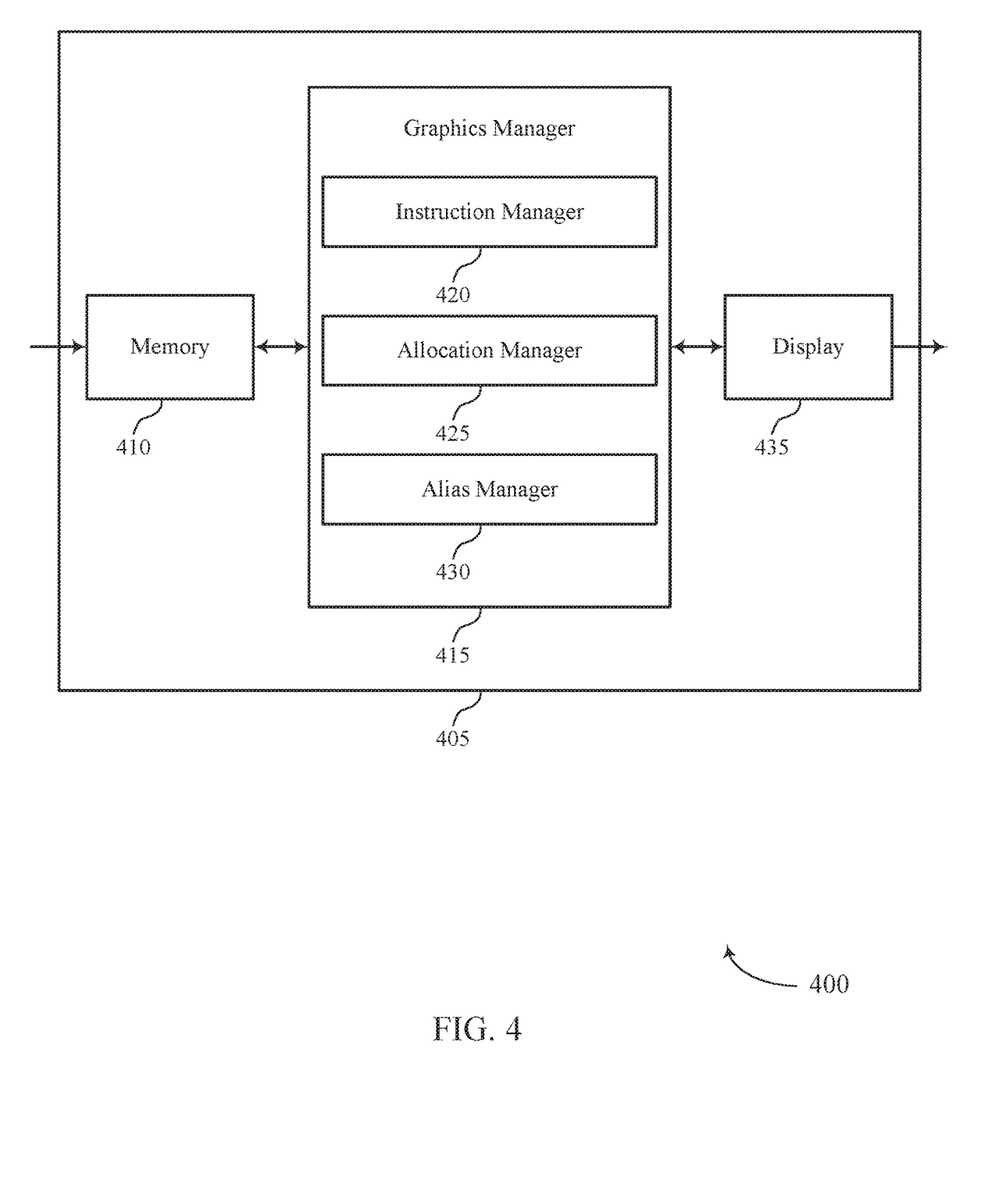

FIG. 4 shows a block diagram 400 of a device 405 that supports graphics instruction operands alias in accordance with aspects of the present disclosure. The device 405 may be an example of aspects of a device 305 or a device 115 as described herein. The device 405 may include a memory 410, a graphics manager 415, and a display 435. The device 405 may also include a processor. Each of these components may be in communication with one another (e.g., via one or more buses).

The memory 410 may receive, transmit, or store information, data, or signals generated by other components of the device 405. In some examples, the memory 410 may be collocated with one or more graphics processors in an imaging device (e.g., device 405). In some examples, the memory 410 may be an example of aspects of memory 630 described with reference to FIG. 6.

The graphics manager 415 may be an example of aspects of the graphics manager 315 as described herein. The graphics manager 415 may include an instruction manager 420, an allocation manager 425, and an alias manager 430. The graphics manager 415 may be an example of aspects of the graphics manager 610 described herein.

The instruction manager 420 may identify a graphics instruction, determine that the graphics instruction is alias enabled for the device, and process the alias instruction.

The allocation manager 425 may partition an alias lookup table into one or more slots and allocate a slot of the alias lookup table based on the partitioning and determining that the graphics instruction is alias enabled.

The alias manager 430, in conjunction with a compiler, may generate an alias instruction based on allocating the slot of the alias lookup table and determining that the graphics instruction is alias enabled.

In some examples, display 435 may display graphics based on processing performed by graphics manager 415 (e.g., processing of alias instructions by graphics manager 415). In some examples, display 435 may or at least some of its sub-components may be implemented in hardware, software executed by a processor, firmware, or any combination thereof. When implemented in software executed by a processor, the functions of the display 435 and/or at least some of its various sub-components may be executed by graphics manager 315, which may include at least one of a general-purpose processor, a DSP, an ASIC, an FPGA or other programmable logic device, discrete gate or transistor logic, discrete hardware components, or any combination thereof designed to perform the functions described in the present disclosure.

Figure 5:
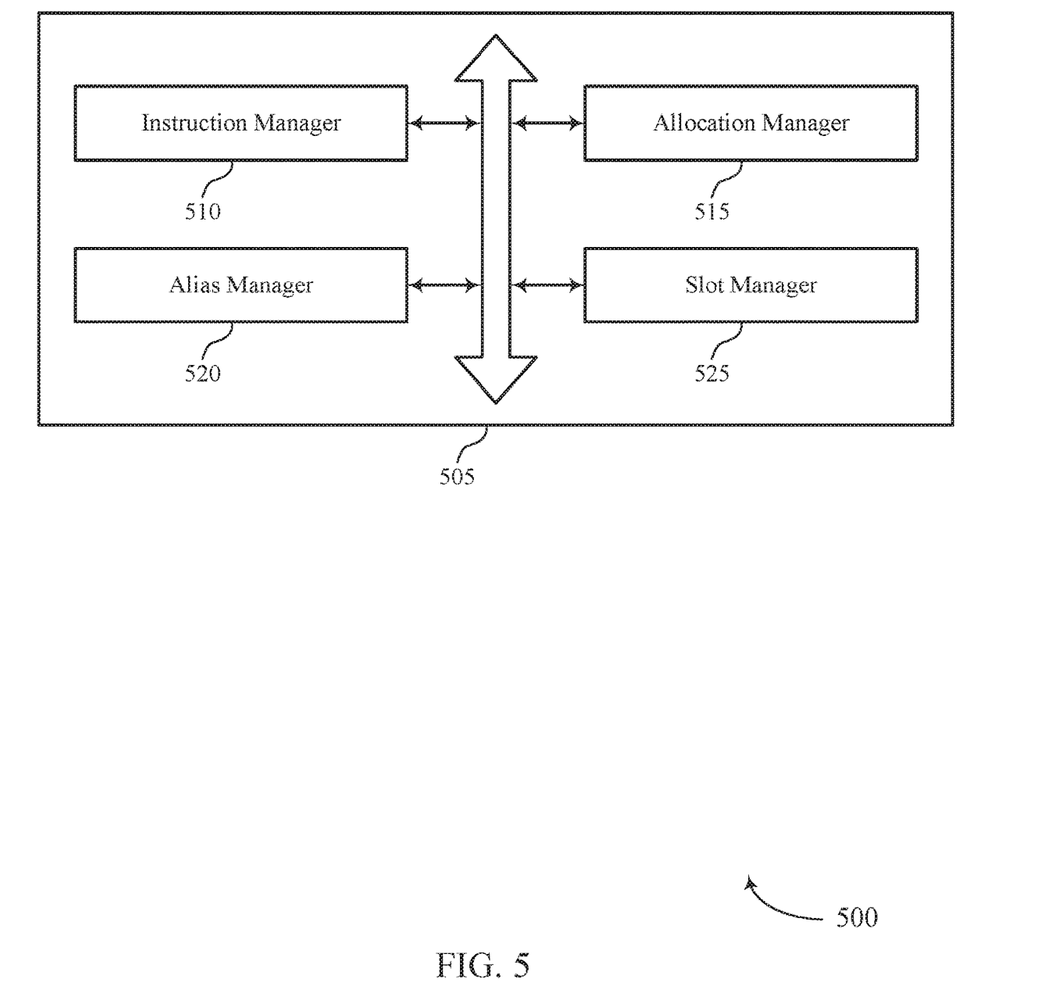
FIG. 5 shows a block diagram of a graphics manager that supports graphics instruction operands alias in accordance with aspects of the present disclosure.

FIG. 5 shows a block diagram 500 of a graphics manager 505 that supports graphics instruction operands alias in accordance with aspects of the present disclosure. The graphics manager 505 may be an example of aspects of a graphics manager 315, a graphics manager 415, or a graphics manager 610 described herein. The graphics manager 505 may include an instruction manager 510, an allocation manager 515, an alias manager 520, and a slot manager 525. Each of these modules may communicate, directly or indirectly, with one another (e.g., via one or more buses).

The instruction manager 510 may identify a graphics instruction. In some examples, the graphics instruction includes a texture instruction or a load store instruction. In some examples, the instruction manager 510 may determine that the graphics instruction is alias enabled for the device.

The allocation manager 515 may partition an alias lookup table into one or more slots. In some examples, the allocation manager 515 may allocate a slot of the alias lookup table based on the partitioning and determining that the graphics instruction is alias enabled. In some examples, an entry of the slot includes a valid bit, or a destination data field, or the source data type, or the source data field, or any combination thereof.

The alias manager 520, in conjunction with a compiler, may generate an alias instruction based on allocating the slot of the alias lookup table and determining that the graphics instruction is alias enabled. In some examples, the instruction manager 510 may process the alias instruction.

In some examples, the allocation manager 515 may identify an operand type associated with the graphics instruction, where the partitioning of the alias lookup table is based on the operand type.

In some examples, the allocation manager 515 may determine that the operand type is a first type. In some examples, the allocation manager 515 may fetch an operand of the graphics instruction from a local buffer of the device. In some examples, the allocation manager 515 may store the operand in a source data field associated with the allocated slot. In some examples, the allocation manager 515 may set a value in a source data type field associated with the allocated slot based on the first type.

In some examples, the instruction manager 510 may process the operand stored in the source data field based on the operand type being the first type. In some examples, the instruction manager 510 may set the source data type as the second type based on determining that the operand type is the second type.

In some examples, the instruction manager 510 may determine that the operand type is a second type different than the first type. In some examples, the instruction manager 510 may process the operand stored in the local buffer based on the operand type being the second type.

In some examples, the allocation manager 515 may configure a number of entries per slot in the alias lookup table based on a size of the graphics instruction or a maximum possible size of the graphics instruction, where a number of slots in the alias lookup table is based on the configured number of entries per slot in the alias lookup table.

In some examples, the slot manager 525 may determine that the operand of the graphics instruction does not fit within the allocated slot or the configured number of entries of the allocated slot. In some examples, the slot manager 525 may use a move instruction with the processing of the alias instruction based on determining that the operand of the graphics instruction does not fit within the allocated slot or the configured number of entries of the allocated slot. The slot manager 525 may configure a number of slots or a number of entries per slot in the alias lookup table based on a predetermined value where the predetermined value is based on an average data size associated with the graphics instruction.

In some examples, the allocation manager 515 may release the slot of the alias lookup table after completing the processing of the graphics instruction.

Figure 6:
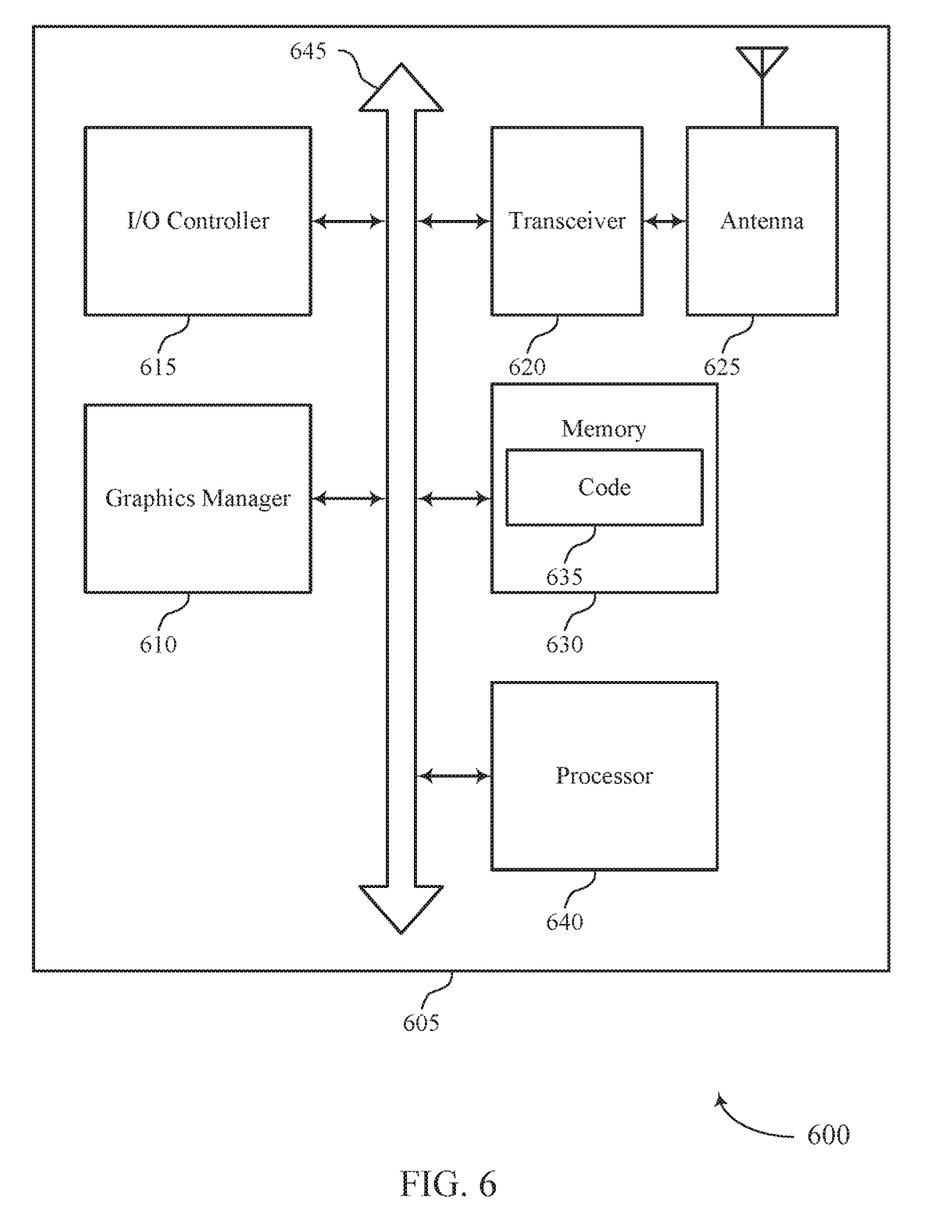
FIG. 6 shows a diagram of a system including a device that supports graphics instruction operands alias in accordance with aspects of the present disclosure.

FIG. 6 shows a diagram of a system 600 including a device 605 that supports graphics instruction operands alias in accordance with aspects of the present disclosure. The device 605 may be an example of or include the components of device 305, device 405, or a device as described herein.

The device 605 may include components for bi-directional voice and data communications including components for transmitting and receiving communications, including a graphics manager 610, an I/controller 615, a transceiver 620, an antenna 625, memory 630, a processor 640, and a coding manager 650. These components may be in electronic communication via one or more buses (e.g., bus 645).

The graphics manager 610 may identify a graphics instruction, determine that the graphics instruction is alias enabled for the device, process the alias instruction, partition an alias lookup table into one or more slots, allocate a slot of the alias lookup table based on the partitioning and determining that the graphics instruction is alias enabled, and in conjunction with a compiler generate an alias instruction based on allocating the slot of the alias lookup table and determining that the graphics instruction is alias enabled.

The I/O controller 615 may manage input and output signals for the device 605. The I/O controller 615 may also manage peripherals not integrated into the device 605. In some examples, the I/O controller 615 may represent a physical connection or port to an external peripheral. In some examples, the I/O controller 615 may utilize an operating system such as iOS®, ANDROID®, MS-DOS®, MS-WINDOWS®, OS/2®, UNIX®, LINUX®, or another known operating system. In other examples, the I/O controller 615 may represent or interact with a modem, a keyboard, a mouse, a touchscreen, or a similar device. In some examples, the I/O controller 615 may be implemented as part of a processor. In some examples, a user may interact with the device 605 via the I/O controller 615 or via hardware components controlled by the I/O controller 615.

The transceiver 620 may communicate bi-directionally, via one or more antennas, wired, or wireless links as described herein. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

In some examples, the wireless device may include a single antenna 625. However, in some examples the device may have more than one antenna 625, which may be capable of concurrently transmitting or receiving multiple wireless transmissions.

The memory 630 may include RAM and ROM. The memory 630 may store computer-readable, computer-executable code 635 including instructions that, when executed, cause the processor to perform various functions described herein. In some examples, the memory 630 may contain, among other things, a BIOS which may control basic hardware or software operation such as the interaction with peripheral components or devices.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 640 may be configured to operate a memory array using a memory controller. In other examples, a memory controller may be integrated into the processor 640. The processor 640 may be configured to execute computer-readable instructions stored in a memory (e.g., the memory 630) to cause the device 605 to perform various functions (e.g., functions or tasks supporting graphics instruction operands alias).

The code 635 may include instructions to implement aspects of the present disclosure, including instructions to support graphic processing. The code 635 may be stored in a non-transitory computer-readable medium such as system memory or other type of memory. In some examples, the code 635 may not be directly executable by the processor 640 but may cause a computer (e.g., when compiled and executed) to perform functions described herein.

Figure 7:
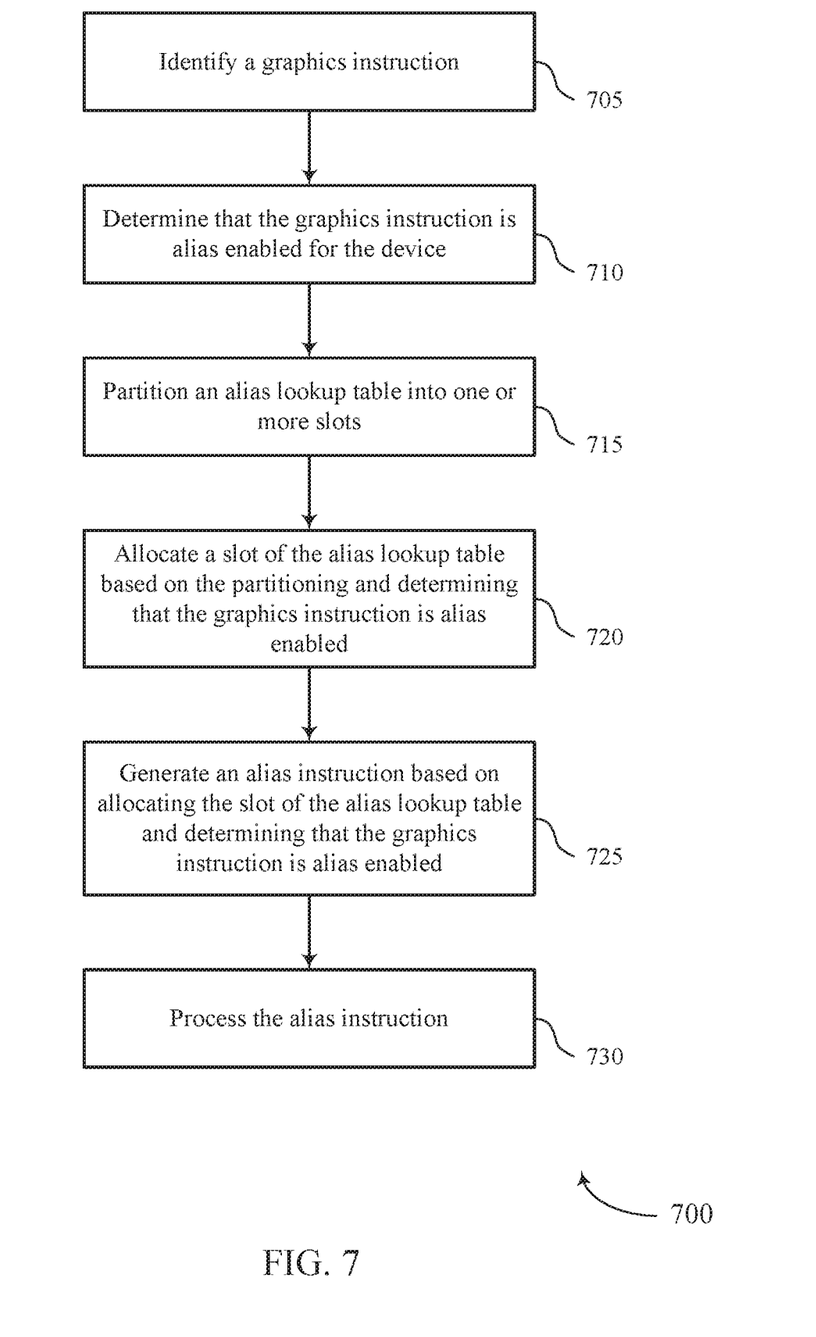
FIGS. 7 and 8 show flowcharts illustrating methods that support graphics instruction operands alias in accordance with aspects of the present disclosure.

FIG. 7 shows a flowchart illustrating a method 700 that supports graphics instruction operands alias in accordance with aspects of the present disclosure. The operations of method 700 may be implemented by a device or its components as described herein. For example, the operations of method 700 may be performed by a graphics manager as described with reference to FIGS. 3 through 6. In some examples, a device may execute a set of instructions to control the functional elements of the device to perform the functions described below. Additionally or alternatively, a device may perform aspects of the functions described below using special-purpose hardware.

At 705, the device may identify a graphics instruction. The operations of 705 may be performed according to the methods described herein. In some examples, aspects of the operations of 705 may be performed by an instruction manager as described with reference to FIGS. 3 through 6.

At 710, the device may determine that the graphics instruction is alias enabled for the device. The operations of 710 may be performed according to the methods described herein. In some examples, aspects of the operations of 710 may be performed by an instruction manager as described with reference to FIGS. 3 through 6.

At 715, the device may partition an alias lookup table into one or more slots. The operations of 715 may be performed according to the methods described herein. In some examples, aspects of the operations of 715 may be performed by an allocation manager as described with reference to FIGS. 3 through 6.

At 720, the device may allocate a slot of the alias lookup table based on the partitioning and determining that the graphics instruction is alias enabled. The operations of 720 may be performed according to the methods described herein. In some examples, aspects of the operations of 720 may be performed by an allocation manager as described with reference to FIGS. 3 through 6.

At 725, a compiler of the device may generate an alias instruction based on allocating the slot of the alias lookup table and determining that the graphics instruction is alias enabled. The operations of 725 may be performed according to the methods described herein. In some examples, aspects of the operations of 725 may be performed by a compiler in conjunction with an alias manager as described with reference to FIGS. 3 through 6.

At 730, the device may process the alias instruction. The operations of 730 may be performed according to the methods described herein. In some examples, aspects of the operations of 730 may be performed by an instruction manager as described with reference to FIGS. 3 through 6.

Figure 8:
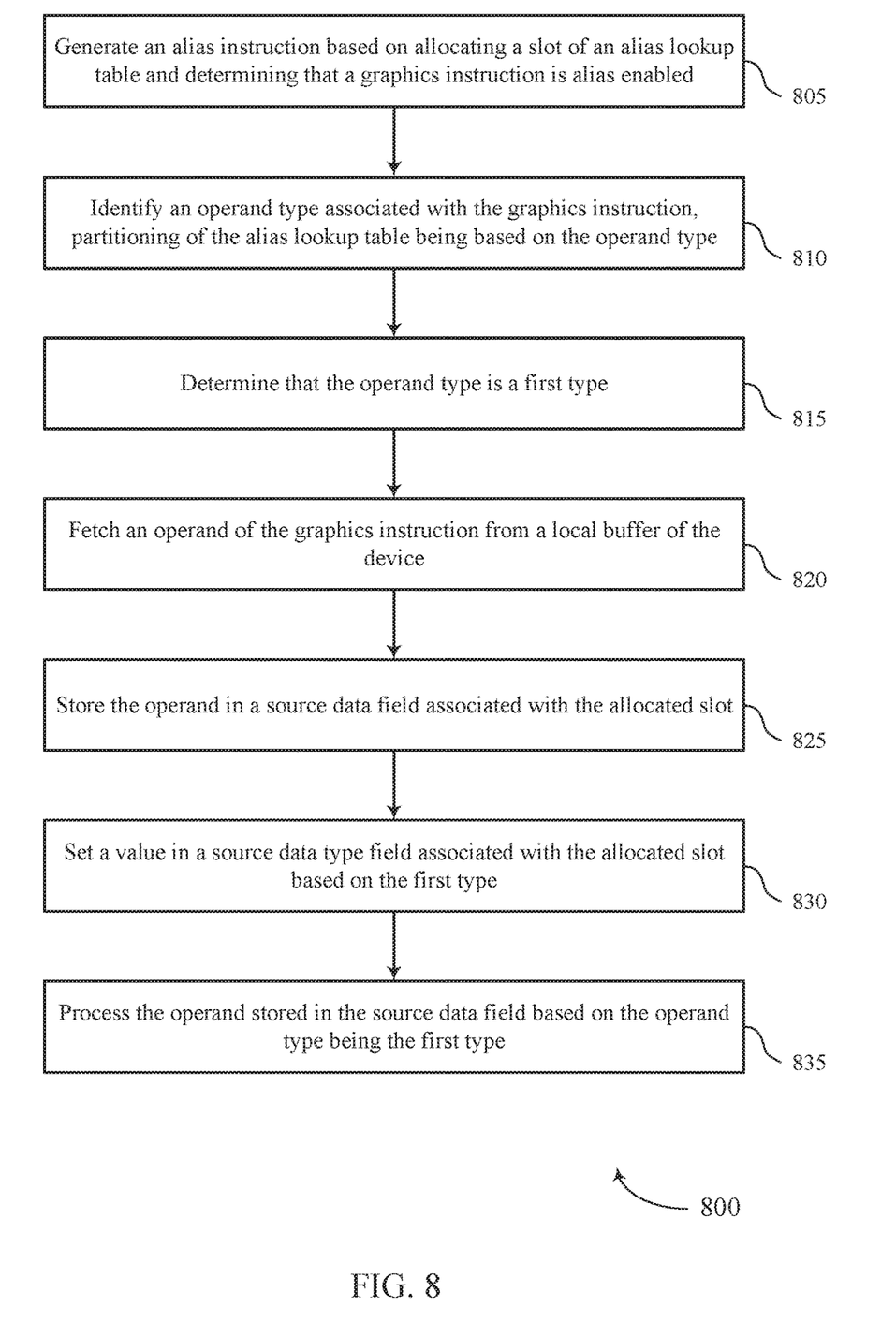

FIG. 8 shows a flowchart illustrating a method 800 that supports graphics instruction operands alias in accordance with aspects of the present disclosure. The operations of method 800 may be implemented by a device or its components as described herein. For example, the operations of method 800 may be performed by a graphics manager as described with reference to FIGS. 3 through 6. In some examples, a device may execute a set of instructions to control the functional elements of the device to perform the functions described below. Additionally or alternatively, a device may perform aspects of the functions described below using special-purpose hardware.

At 805, a compiler of the device may generate an alias instruction based on allocating a slot of an alias lookup table and determining that a graphics instruction is alias enabled. The operations of 805 may be performed according to the methods described herein. In some examples, aspects of the operations of 805 may be performed by an alias manager as described with reference to FIGS. 3 through 6.

At 810, the device may identify an operand type associated with the graphics instruction, where partitioning of the alias lookup table is based on the operand type. The operations of 810 may be performed according to the methods described herein. In some examples, aspects of the operations of 810 may be performed by an allocation manager as described with reference to FIGS. 3 through 6.

At 815, the device may determine that the operand type is a first type. The operations of 815 may be performed according to the methods described herein. In some examples, aspects of the operations of 815 may be performed by an allocation manager as described with reference to FIGS. 3 through 6.

At 820, the device may fetch an operand of the graphics instruction from a local buffer of the device. The operations of 820 may be performed according to the methods described herein. In some examples, aspects of the operations of 820 may be performed by an allocation manager as described with reference to FIGS. 3 through 6.

At 825, the device may store the operand in a source data field associated with the allocated slot. The operations of 825 may be performed according to the methods described herein. In some examples, aspects of the operations of 825 may be performed by an allocation manager as described with reference to FIGS. 3 through 6.

At 830, the device may set a value in a source data type field associated with the allocated slot based on the first type. The operations of 830 may be performed according to the methods described herein. In some examples, aspects of the operations of 830 may be performed by an allocation manager as described with reference to FIGS. 3 through 6.

At 835, the device may process the operand stored in the source data field based on the operand type being the first type. In some examples, processing the graphics instruction may include processing the operand. The operations of 835 may be performed according to the methods described herein. In some examples, aspects of the operations of 835 may be performed by an instruction manager as described with reference to FIGS. 3 through 6.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. When implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for graphic processing by a device, comprising:
   identifying a graphics instruction;
   determining that the graphics instruction is alias enabled for the device;
   partitioning an alias lookup table into one or more slots;
   allocating a slot of the alias lookup table based at least in part on the partitioning and determining that the graphics instruction is alias enabled;
   generating an alias instruction based at least in part on allocating the slot of the alias lookup table and determining that the graphics instruction is alias enabled; and
   processing the alias instruction.

2. The method of claim 1, further comprising:
   identifying an operand type associated with the graphics instruction, wherein the partitioning of the alias lookup table is based at least in part on the operand type.

3. The method of claim 2, further comprising:
   determining that the operand type is a first type;
   fetching an operand of the graphics instruction from a local buffer of the device;
   storing the operand in a source data field associated with the allocated slot; and
   setting a value in a source data type field associated with the allocated slot based at least in part on the first type.

4. The method of claim 3, wherein processing the alias instruction comprises:
   processing the operand stored in the source data field based at least in part on the operand type being the first type.

5. The method of claim 3, further comprising:
   determining that the operand type is a second type different than the first type; and
   setting the source data type as the second type based at least in part on determining that the operand type is the second type.

6. The method of claim 5, wherein processing the alias instruction comprises:
   processing the operand stored in the local buffer based at least in part on the operand type being the second type.

7. The method of claim 3, wherein an entry of the slot includes a valid bit, or a destination data field, or the source data type, or the source data field, or any combination thereof.

8. The method of claim 7, further comprising:
   configuring a number of slots or a number of entries per slot in the alias lookup table based at least in part on a predetermined value, wherein the predetermined value is based at least in part on an average data size associated with the graphics instruction.

9. The method of claim 8, further comprising:
   determining that the operand of the graphics instruction does not fit within the allocated slot or the configured number of entries of the allocated slot; and
   using a move instruction with the processing of the alias instruction based at least in part on determining that the operand of the graphics instruction does not fit within the allocated slot or the configured number of entries of the allocated slot.

10. The method of claim 1, further comprising:
    configuring a number of entries per slot in the alias lookup table based at least in part on a size of the graphics instruction or a maximum possible size of the graphics instruction, wherein a number of slots in the alias lookup table is based at least in part on the configured number of entries per slot in the alias lookup table.

11. The method of claim 1, further comprising:
    releasing the slot of the alias lookup table after completing the processing of the graphics instruction.

12. The method of claim 1, wherein the graphics instruction includes a texture instruction or a load store instruction.

13. An apparatus for graphic processing, comprising:
    a processor,
    memory coupled with the processor; and
    instructions stored in the memory and executable by the processor to cause the apparatus to:
    identify a graphics instruction;
    determine that the graphics instruction is alias enabled for the apparatus;
    partition an alias lookup table into one or more slots;
    allocate a slot of the alias lookup table based at least in part on the partitioning and determining that the graphics instruction is alias enabled;
    generate an alias instruction based at least in part on allocating the slot of the alias lookup table and determining that the graphics instruction is alias enabled; and process the alias instruction.

14. The apparatus of claim 13, wherein the instructions are further executable by the processor to cause the apparatus to:
    identify an operand type associated with the graphics instruction, wherein the partitioning of the alias lookup table is based at least in part on the operand type.

15. The apparatus of claim 14, wherein the instructions are further executable by the processor to cause the apparatus to:
    determine that the operand type is a first type;
    fetch an operand of the graphics instruction from a local buffer of the apparatus;
    store the operand in a source data field associated with the allocated slot: and
    set a value in a source data type field associated with the allocated slot based at least in part on the first type.

16. The apparatus of claim 15, wherein the instructions to process the alias instruction are executable by the processor to cause the apparatus to:
  process the operand stored in the source data field based at least in part on the operand type being the first type.

17. The apparatus of claim 15, wherein the instructions are further executable by the processor to cause the apparatus to:
  determine that the operand type is a second type different than the first type; and
  set the source data type as the second type based at least in part on determining that the operand type is the second type.

18. The apparatus of claim 17, wherein the instructions to process the alias instruction are executable by the processor to cause the apparatus to:
  process the operand stored in the local buffer based at least in part on the operand type being the second type.

19. A non-transitory computer-readable medium storing code for graphic processing by a device, the code comprising instructions executable by a processor to:
  identify a graphics instruction;
  determine that the graphics instruction is alias enabled for the device;
  partition an alias lookup table into one or more slots;
  allocate a slot of the alias lookup table based at least in part on the partitioning and determining that the graphics instruction is alias enabled;
  generate an alias instruction based at least in part on allocating the slot of the alias lookup table and determining that the graphics instruction is alias enabled; and
  process the alias instruction.

20. The non-transitory computer-readable medium of claim 19, wherein the instructions are further executable to:
  identify an operand type associated with the graphics instruction, wherein the partitioning of the alias lookup table is based at least in part on the operand type.

* * * * *